Sept. 16, 1958
G. H. BEUSKER
2,851,924
ADJUSTABLE OCULAR MOUNTING
Filed Sept. 28, 1955
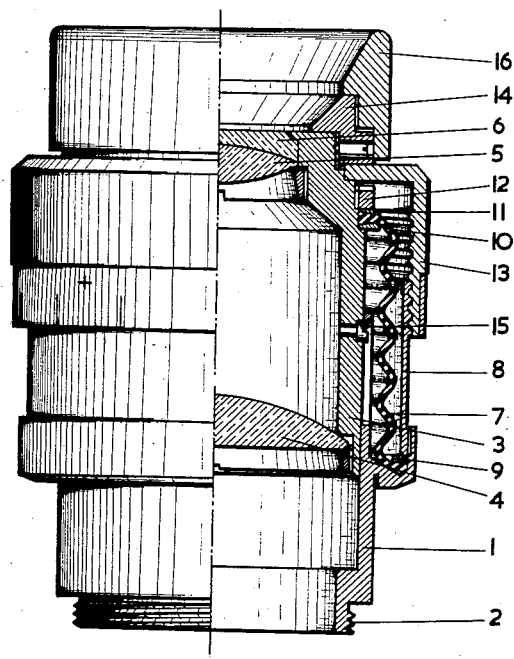
INVENTOR.
Gerardus Hendrikus Beusker
BY
Tounsen P. Beaman

United States Patent Office 2,851,924
Patented Sept. 16, 1958

2,851,924
ADJUSTABLE OCULAR MOUNTING

Gerardus Hendrikus Beusker, Arnhem, Netherlands, assignor to N. V. Nederlandsche Instrumenten Compagnie "Nedinsco," Venlo, Netherlands, a corporation of the Netherlands Application September 28, 1955, Serial No. 537,172

1 Claim. (Cl. 88—32)

This invention relates to an adjustable ocular mounting, more particularly for monocular telescopes and binoculars, comprising an ocular casing and a sleeve carrying the lenses of the ocular, which sleeve slidingly fits in the casing, the casing and the sleeve being surrounded by a flexible sealing means.

An ocular mounting of this type is known. In said known mounting the sleeve must perform a rotational movement about the casing during the adjustment in axial direction so that the sealing means secured to the sleeve performs a sliding movement over the casing. When the flexibility of the material of said sealing means deteriorates the sealing aimed at becomes illusory.

The object of this invention is to provide an ocular mounting in which the sealing means will continue performing its function faultlessly, also after a long time.

To that end the ocular mounting according to the invention is so constructed that the sleeve is mounted so as to be slidable relative to the casing in axial direction only, the sealing means being in the form of a bellows having its upper and lower edge secured to the sleeve and to the casing respectively in hermetically sealing relationship therewith.

Owing to the fact that the movement of the sleeve relative to the casing is solely an axial one the bellows-shaped sealing means in substantially not subjected to stresses affecting its flexibility, so that a long life is guaranteed.

It should be noted that a bellows-shaped sealing means is known per se, but this is so arranged that it does not constitute a protection for the surfaces of the sleeve and the casing moving over each other.

The invention will be elucidated with reference to the accompanying drawing, showing by way of example an embodiment of the adjustable water tight ocular mounting, one half being shown in longitudinal section and one half being shown as an elevation.

In the drawing the reference numeral 1 designates the ocular casing which is adapted to be secured to the body of the monocular or binocular (not shown) by means of screw thread 2. The sleeve 3 in which the lenses 4, 5 and 6 are hermetically secured is adapted to slide up and down in the ocular casing 1.

The parts 1 and 3 are interconnected by a bellows 7. Said bellows has its one end clamped into the collar of the ocular casing 1 by a sleeve 8 pressing the ring 9 onto the material (e. g. rubber) of the bellows, thus effecting the desired hermetic sealing. The other end of the bellows is accommodated between the rings 10 and 11 pressing said end on a shoulder of the sleeve 3 under the influence of a screwring 12.

In this manner an air and liquid tight connection between the parts 1 and 3 is obtained.

For focussing the ocular lenses it is necessary to slide the sleeve 3 in a direction corresponding with the longitudinal axis of the ocular casing 1. To that end the sleeve 8 is provided with external screw thread which is in mesh with the internal screw thread of an adjusting sleeve 13, the upper end of which is bent radially inwards and is rotatably enclosed between a shoulder of the ocular sleeve 3 and an adjusting ring 14 secured to said sleeve, which ring 14 likewise carries the eye cap 16. Because the sleeve 3 is axially guided by means of a set screw 15, the head of which is located in a longitudinal slot of the ocular casing 1, the sleeve will be shifted in axial direction when the adjusting sleeve 13 is turned for focussing the ocular. The bellows 7 is so flexible that the ocular sleeve 3 is capable of occupying the final positions relative to the ocular casing 1, which positions are defined by the screw 15 and the ends of the slot in the ocular casing 1.

I claim:

An adjustable ocular mounting for use with optical devices, comprising a tubular casing adapted to be affixed to the device, a lens supporting sleeve telescopingly supported within said casing, a slot defined in said casing parallel to the axis thereof, means affixed to said sleeve positioned within said slot preventing relative rotation between said casing and sleeve, a lead sleeve threadingly affixed to said casing concentric thereto having lead threads formed thereon, an adjusting sleeve rotatably supported on said lens supporting sleeve and fixed against relative axial movement thereto, threads formed on said adjusting sleeve mating with the lead threads of said lead sleeve whereby rotation of said adjusting sleeve produces relative axial movement of said lens supporting sleeve and said casing, an adjusting ring removably secured to one end of said lens sleeve abutting said adjusting sleeve, an annular eye cap threadedly affixed to said adjusting ring, said casing, lens supporting sleeve, lead sleeve and adjusting sleeve defining a closed annular chamber, a protective annular bellows totally within said chamber, a first compression ring in abutting engagement with one end of said lead sleeve sealingly affixing one end of said bellows to said casing, a second compression ring sealingly affixing the other end of said bellows to said lens supporting sleeve and an annular screw ring within said chamber in threaded engagement with said lens supporting sleeve adapted to compress said second compression ring.

References Cited in the file of this patent
UNITED STATES PATENTS

| | | |
|---|---|---|
| 1,324,448 | Greiner | Dec. 9, 1919 |
| 2,320,504 | Bailey | June 1, 1943 |

FOREIGN PATENTS

| | | |
|---|---|---|
| 362,725 | Great Britain | Dec. 10, 1931 |
| 402,486 | Italy | Mar. 11, 1943 |
| 1,013,260 | France | Apr. 30, 1952 |